United States Patent [19]

Dunn et al.

[11] 4,393,796
[45] Jul. 19, 1983

[54] ARRANGEMENT FOR OPERATING AN ELECTRONICALLY CONTROLLED SEWING MACHINE IN A DIAGNOSTIC MODE

[75] Inventors: William H. Dunn, Frankford Township, Sussex County; Leonard I. Horey, West Orange; Marvin Kurland, East Brunswick, all of N.J.

[73] Assignee: The Singer Company, Stamford, Conn.

[21] Appl. No.: 393,148

[22] Filed: Jun. 28, 1982

[51] Int. Cl.³ .................. D05B 3/02; D05B 79/00
[52] U.S. Cl. ......................... 112/158 E; 112/158 F
[58] Field of Search ............... 112/158 E, 158 F, 275, 112/277, 220, 221, 121.11

[56] References Cited

U.S. PATENT DOCUMENTS

| | | | |
|---|---|---|---|
| 4,256,047 | 3/1981 | Suzuki et al. | 112/158 E |
| 4,274,348 | 6/1981 | Kato | 112/158 E |
| 4,342,271 | 8/1982 | Socha | 112/158 E |

FOREIGN PATENT DOCUMENTS 2076573 5/1981 United Kingdom .

*Primary Examiner*—Peter P. Nerbun
*Attorney, Agent, or Firm*—David L. Davis; Robert E. Smith; Edward L. Bell

[57] ABSTRACT

An electronically controlled sewing machine includes an arrangement for operating the machine in a diagnostic mode, wherein several tests for checking the functioning of the sewing machine can be performed. In a first test, all of the light emitting diodes on the panel of the sewing machine are sequentially energized. This verifies proper operation of the display panel. In a second test, a particular light emitting diode responds to the armshaft sensor such that it is dark when the needle is up and is illuminated when the needle is down. The motor speed function is monitored by a test which lights particular light emitting diodes in 100 stitches per minute increments of motor speed. Proper overall operation of the sewing machine, including the actuators, is monitored by running several test patterns. To isolate a possible fault in the sewing machine foot controller, the sewing machine may be run at a preset speed without depressing the foot controller.

6 Claims, 7 Drawing Figures

ARRANGEMENT FOR OPERATING AN ELECTRONICALLY CONTROLLED SEWING MACHINE IN A DIAGNOSTIC MODE

DESCRIPTION

Background of the Invention

This invention relates to sewing machines and, more particularly, to electronically controlled sewing machines.

Sewing machines employing sophisticated electronic technology for the storage and subsequent retrieval of stitch pattern information for a multiplicity of patterns have enjoyed great commercial success in recent years. One great advantage of the use of an electronically controlled sewing machine is in its simplicity of operation and control, as perceived by the user. On the other hand, if such a machine malfunctions, it is often difficult for a service technician to diagnose the reason for such malfunction. Accordingly, it would be desirable to provide an aid to help a service technician in diagnosing faults in an electronically controlled sewing machine.

It is therefore an object of the present invention to provide an arrangement for operating an electronically controlled sewing machine in a diagnostic mode.

It would also be desirable to provide such an arrangement without adding any hardware, so that the cost of the sewing machine is kept low.

It is therefore a further object of the present invention to provide an arrangement for operating an electronically controlled sewing machine in a diagnostic mode which utilizes the already existing hardware of the sewing machine.

SUMMARY OF THE INVENTION

The foregoing and additional objects are attained in accordance with the principles of this invention by providing an electronically controlled sewing machine including diagnostic means for operating the sewing machine in a diagnostic mode. The sewing machine includes input means for allowing an operator to select functions to be performed by the sewing machine and indicating means for providing an indication of the function selected by an operator via the input means. The diagnostic means includes means for utilizing the indicating means to provide an indication to the operator of the operation of the sewing machine while in the diagnostic mode.

In accordance with an aspect of this invention, the arrangement includes means for monitoring the speed of operation of the sewing machine and utilizing the indicating means to indicate the speed of operation.

In accordance with another aspect of this invention, the sewing machine includes motor control means for controlling the speed of operation of the sewing machine which normally operates in response to an operator setting of a speed control device, such as a foot controller. The arrangement includes means for operating the sewing machine at a fixed predetermined speed independent of operator control.

In accordance with a further aspect of this invention, the arrangement includes means for utilizing the indicating means to indicate the relative position of the sewing machine needle.

In accordance with yet a further aspect of this invention, the diagnostic means includes means for controlling the indicating means to indicate the sewing machine functions in a predetermined ordered sequence and at a regular rate. This allows the service technician to check on the functioning of the indicating means.

BRIEF DESCRIPTION OF THE DRAWINGS

The foregoing will be more readily apparent upon reading the following description in conjunction with the drawings wherein.

DETAILED DESCRIPTION

Figure 1:
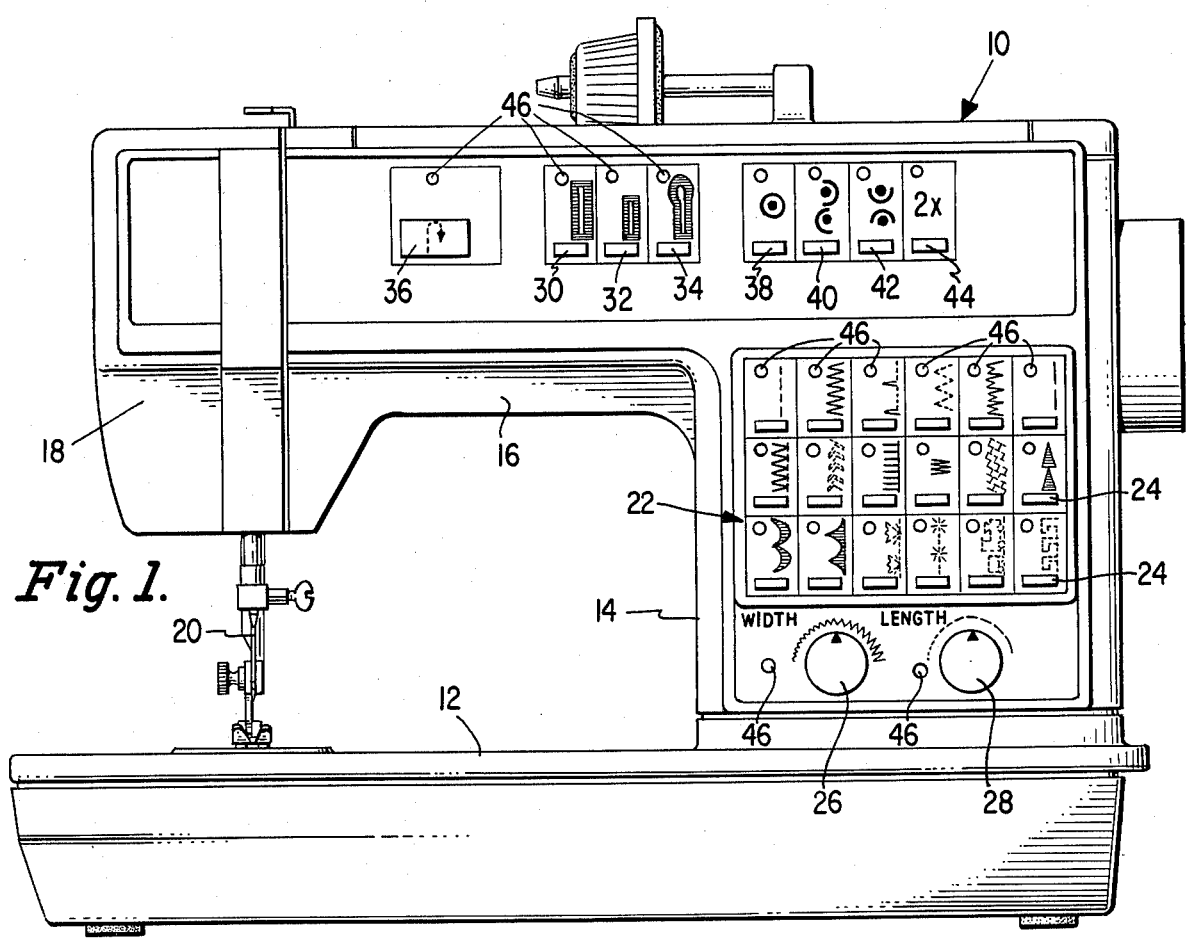
FIG. 1 is a front elevational view of an illustrative sewing machine in which this invention may be incorporated.

Referring now to the drawings, wherein like elements in different figures thereof have the same reference character applied thereto, FIG. 1 shows a sewing machine designated generally by the reference numeral 10. The sewing machine 10 includes a work supporting bed 12, a standard 14, a bracket arm 16 and a sewing head 18. The sewing machine stitch forming instrumentalities include a needle 20 capable of being endwise reciprocated and laterally jogged to form zig zag stitches and a work feed dog (not shown) operating upwardly through slots formed in a throat plate on the bed 12 to transport the work across the bed 12 between needle penetrations. The pattern of stitches produced by operation of the sewing machine, i.e., the positional coordinates of each stitch penetration may be influenced, for example, by data stored in a memory unit and extracted in timed relation with the operation of the sewing machine, as is well known in the art.

On the front panel of the sewing machine 10 there is provided an input means whereby the operator can effect control of the functions of the sewing machine. This input means includes switches and dials whereby the operator may select a pattern to be sewn by the sewing machine as well as effecting modifications to the pattern. Pattern selection is effected illustratively through an array 22 of pushbutton switches 24, each of which corresponds to a pattern of stitches, the information for forming which is stored within the memory of the sewing machine 10. Associated with each of the pushbutton switches 24 is a pictorial representation of the pattern as it would be sewn by the sewing machine upon actuation of that switch. The input means also includes a stitch width control (bight override) 26 and a stitch length control (feed override) 28. The controls 26 and 28 each includes a pushbutton switch which is operator actuated to effect the respective width or length modification and includes a rotary portion for setting the magnitude of the modification. There are also provided pushbutton switches 30, 32 and 34 for selecting large buttonhole, small buttonhole and round end buttonhole patterns, respectively. A pushbutton switch 36 is provided for reverse sewing. Single pattern selection is effected via a switch 38. The mirror image of a pattern in the bight direction is selected via the switch 40 and the mirror image of the pattern in the feeding direction is selected via the switch 42. The switch 44 is utilized for doubling the length of a sewn pattern. Indicating means for indicating to an operator the status of each of the various functions which may be selected is also provided on the front panel of the sewing machine 10. Illustratively, this takes the form of a plurality of light emitting diodes (LED's) 46 each in close proximity to its respective input switch.

Figure 2:
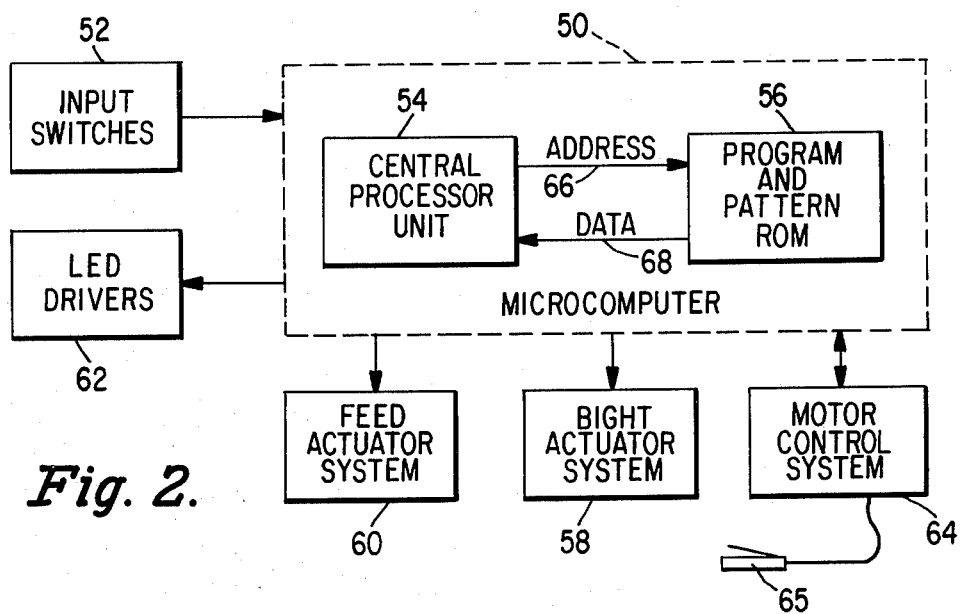
FIG. 2 illustrates a general block diagram of a microcomputer based control system for the sewing machine of FIG. 1.

FIG. 2 shows a general block diagram of a microcomputer based controller for an electronic stitch pattern sewing machine, which controller may be utilized to control the operation of the sewing machine 10 (FIG. 1) and which operates in accordance with the principles of this invention. Accordingly, the microcomputer 50 receives input signals from the input switches 52 indicative of the functions the sewing machine operator desires to be performed by the sewing machine. The input switches 52 may include the pattern selection switches 24 and 30–34 as well as the function switches 26, 28 and 36–44. The microcomputer 50 includes an internal central processor unit (CPU) 54 and a program and pattern ROM 56. The CPU 54 obtains from the ROM 56, in timed relation with the operation of the sewing machine, pattern data for controlling the bight actuator system 58 and the feed actuator system 60. The bight actuator system 58 and the feed actuator system 60 are similar in construction and are adapted to convert a digital code word from the microcomputer 50 into a mechanical position which locates the sewing machine needle in a conventional stitch forming instrumentality and provides a specific work feed for each needle penetration, respectively, as is well known in the art. The microcomputer 50 also provides signals to the LED drivers 62 to control the illumination of the LEDs 46 (FIG. 1) to indicate the function selected by the sewing machine operator. Also shown in FIG. 2 is a motor control system 64 which communicates with the microcomputer and which may be controlled by the microcomputer such as, for example, to prevent the sewing machine from operating or to limit the speed at which the sewing machine can be operated or even to operate the sewing machine without operator intervention. During normal sewing, the motor control system 64 operates the sewing machine 10 in accordance with operator commands received from, for example, a foot controller 65. Illustratively, the microcomputer 50 is a type TMS 7040 microcomputer manufactured by Texas Instruments wherein the CPU 54 provides addresses to the ROM 56 over the leads 66 and receives in return bytes of data and program over the leads 68.

In accordance with the principles of this invention, under operator control, the sewing machine 10 may be placed in a diagnostic mode. This may be accomplished by supplying to people authorized to operate the machine in a diagnostic mode, such as for example, service technicians, a plug-in module which fits into an appropriate receptacle (not shown) and which functionally replaces the program and pattern ROM 56 (FIG. 2) with a diagnostic ROM for operating the sewing machine 10 in a diagnostic mode. Alternatively, the program and pattern ROM 56 may be provided with a diagnostic program and data for operating the sewing machine in a diagnostic mode, which program and data would be accessed by the operator (technician) actuating an anomalous combination of the pattern selection switches 24, such as, for example, by simultaneously depressing a defined pair of the switches.

When the machine is placed in the diagnostic mode, a test of the LEDs 46 is automatically initiated. Each of the LEDs 46 from left to right, beginning with the LED associated with the reverse switch 36, and proceeding across and down the panel of the sewing machine 10, ending with the LED associated with the feed override switch 28, is lit for about ½ second. When the sewing machine is in the diagnostic mode, the actuation of only five of the switches is recognized, all other switch actuations being ignored. Thus, if the operator actuates the straight stitch switch, the sewing machine 10 will be controlled to sew a straight stitch. If the operator actuates the zig zag switch, the sewing machine is caused to sew a ric rac pattern. If the operator actuates the blindstitch switch, a motor test is performed, as will be described hereinafter. If the bight override switch 26 or the feed override switch 28 is actuated, the corresponding override is turned on or off.

During the LED test, the needle bar remains in the center (straight stitch) position, but signals from the armshaft sensor (not shown) are ignored and the bight and feed actuators remain stationary. When the LED test is completed, the LED associated with the reverse switch 36 is caused to respond to the armshaft sensor such that it is dark when the needle is up and illuminated when the needle is down. Actuating the straight stitch switch selects that pattern and if the LED test is still running, it is terminated immediately. The LED associated with the straight stitch switch is illuminated. Actuating the zig zag switch selects the ric rac pattern but illuminates the LED associated with the zig zag switch. This operation also terminates the LED test if it is running. Actuating the blindstitch switch causes the sewing machine to run at a fixed speed without operator control of the foot controller. This test is a partial check to isolate a defect in the foot controller. The LED test is terminated when this test is selected.

After the LED test is concluded, the speed of the sewing machine is monitored and displayed by means of the bottommost row of the LEDs 46. Thus, if the sewing machine speed is between 650 and 750 stitches per minute, the leftmost of the LEDs in the bottom row is illuminated. As the speed increases, in 100 stitches per minute range increments, succeeding LEDs in that row are illuminated until the last LED in the row is illuminated when the speed is between 1150 and 1250 stitches per minute.

Figure 3A:
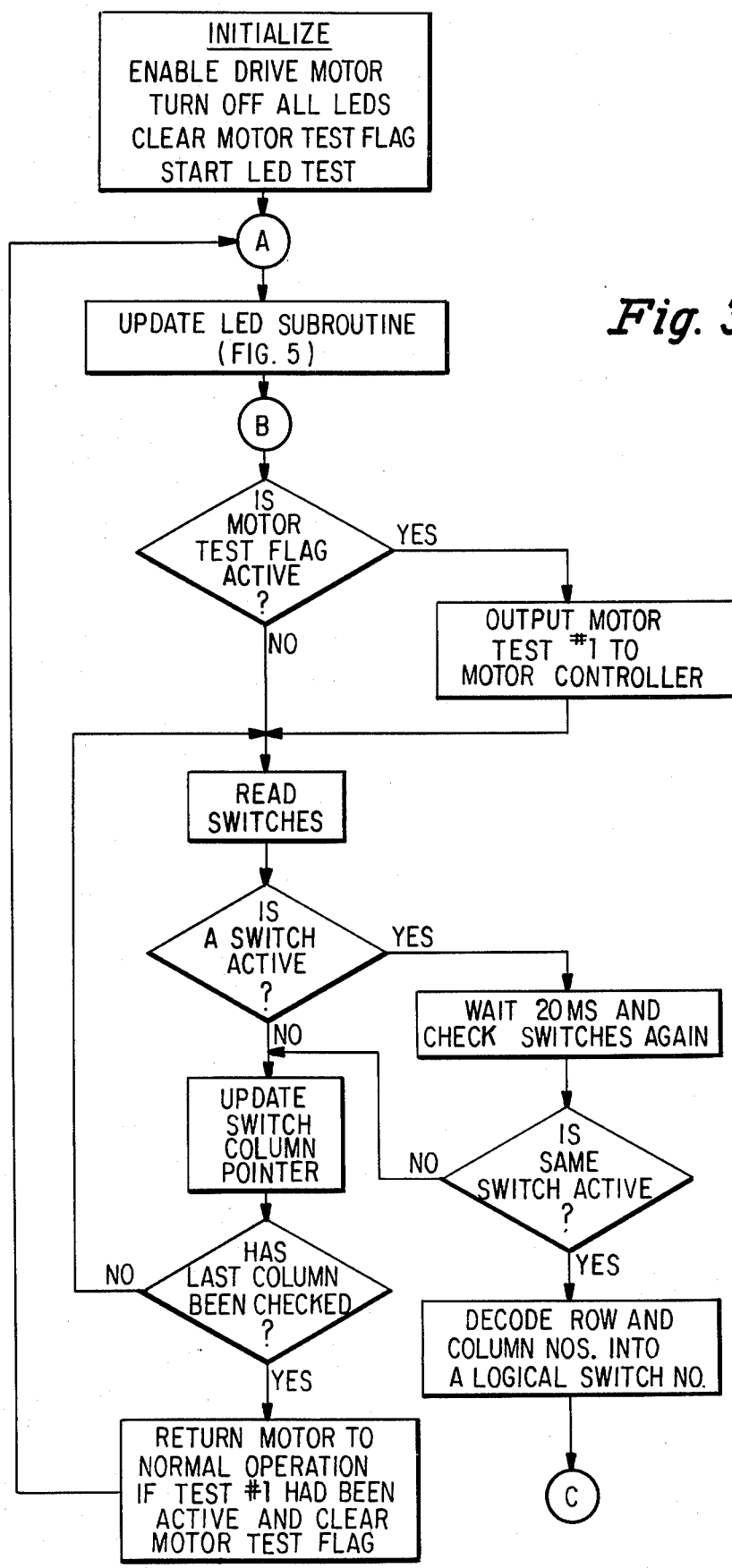
FIGS. 3A, 3B, 4A, 4B and 5 are flow charts of programs and subroutines for operating the microcomputer of FIG. 2 in accordance with the principles of this invention.
Figure 3B:
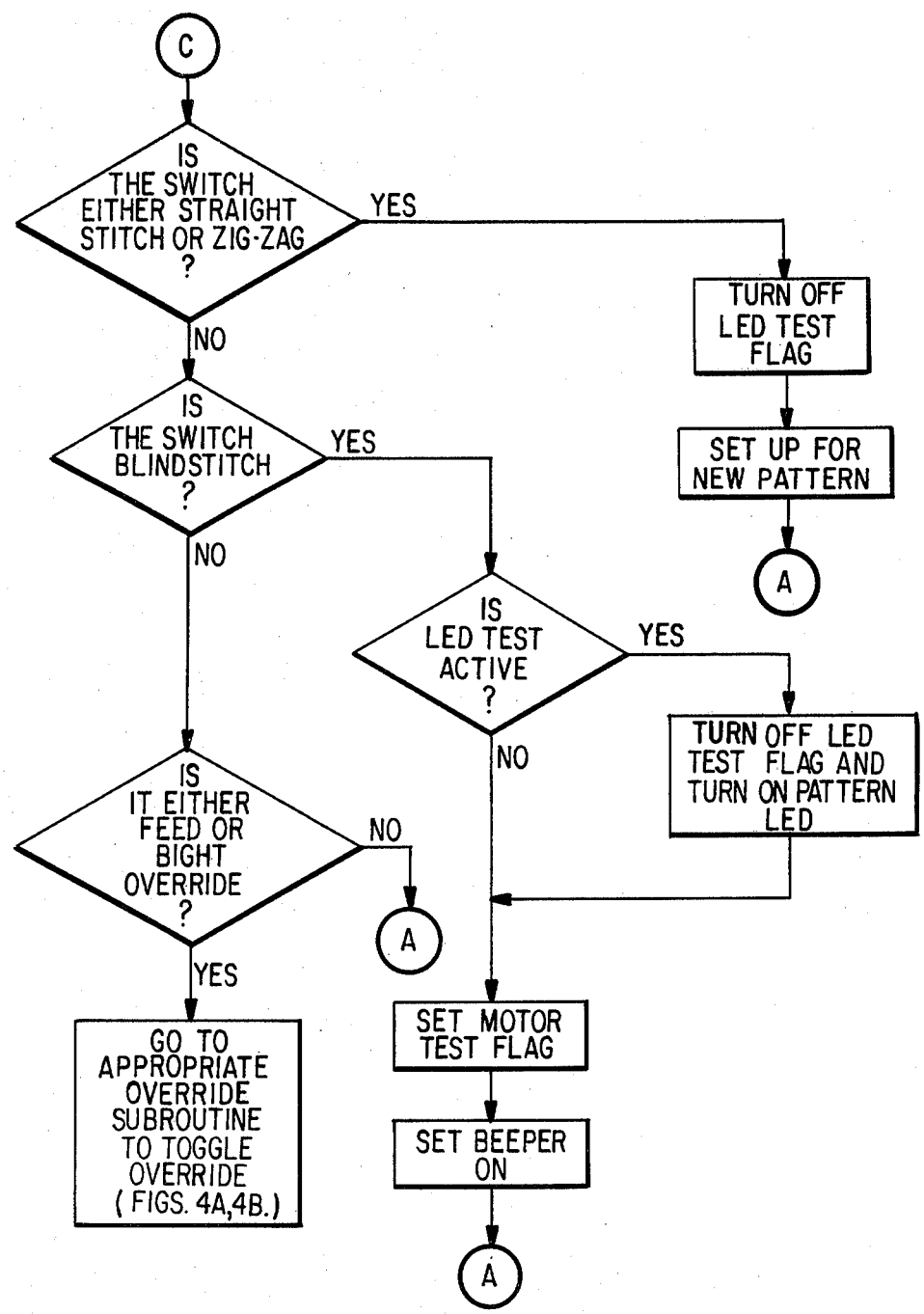
Figure 4A:
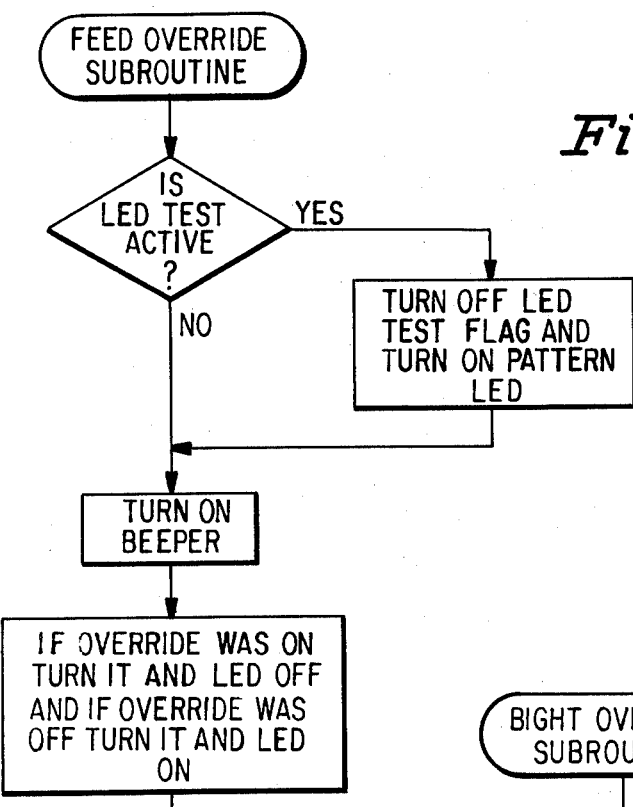
Figure 4B:
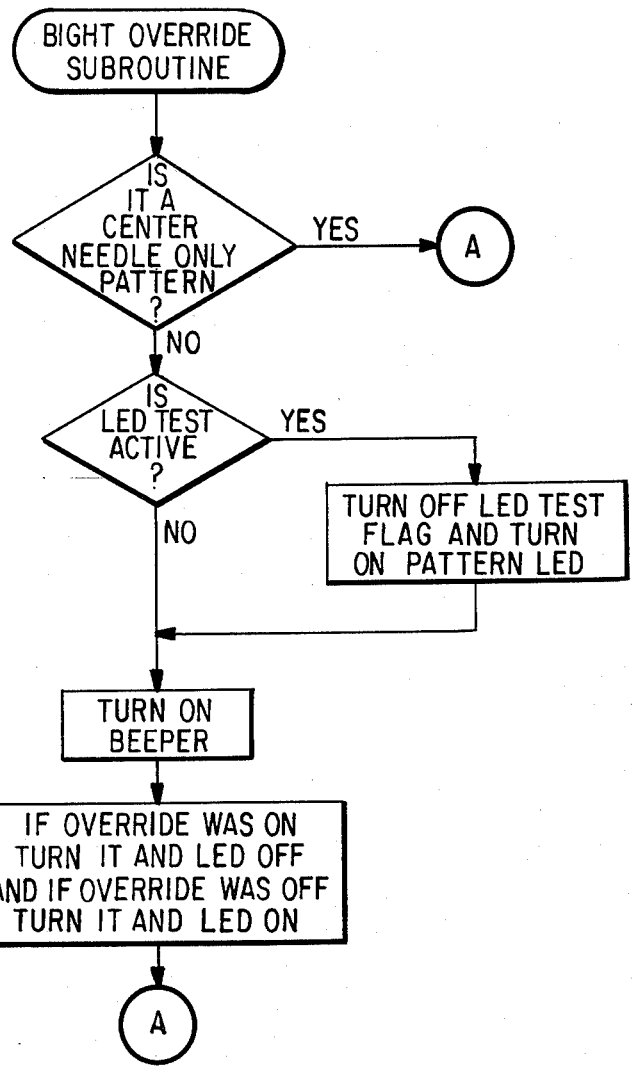
Figure 5:
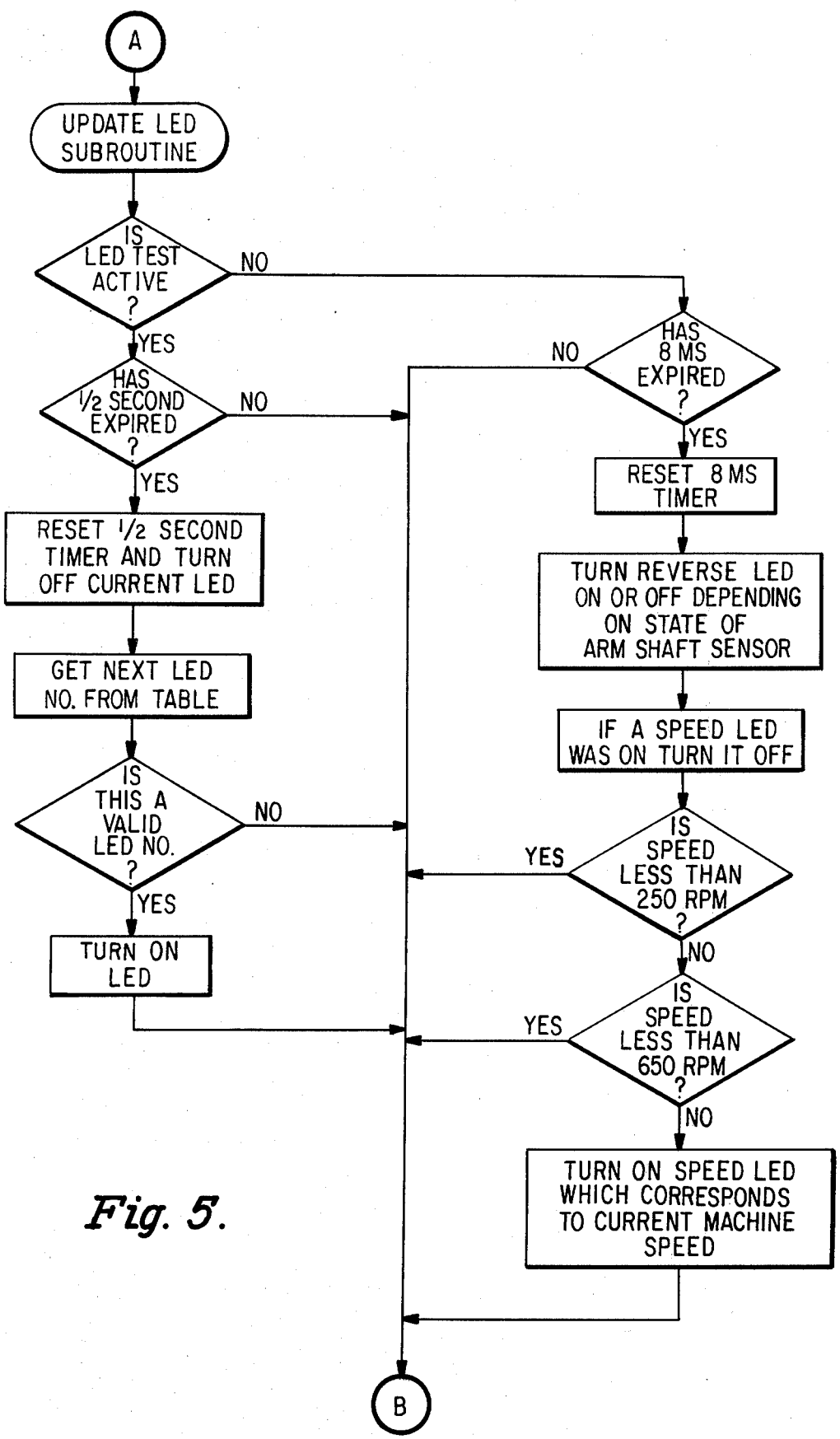

The APPENDIX to this specification illustrates a program for operating the microcomputer 50 in a diagnostic mode, as discussed above. This program is written in assembly language for the TMS 7040 microcomputer, and is for a machine having a specific switch configuration slightly different from that illustrated in FIG. 1. However, the operation of the sewing machine in accordance with the program in the APPENDIX is as described above. FIGS. 3A and 3B together form a flowchart for the program set forth in tfhe APPENDIX FIGS. 4A and 4B are flowcharts of subroutines of that program for the feed and bight overrides, respectively. FIG. 5 is a flowchart of a subroutine of that program for illuminating the LEDs.

Accordingly, there has been disclosed an arrangement for operating a sewing machine in a diagnostic mode. Since this arrangement utilizes switches and indicators which are already available in the sewing machine, no additional hardware is required. It is understood that the above-described embodiment is merely illustrative of the application of the principles of this invention. Numerous other embodiments may be devised by those skilled in the art without departing from the spirit and scope of this invention, as defined by the appended claims. For example, although a programmed microcomputer has been disclosed, this invention may also be practiced with a hard wired processor.

APPENDIX

```
0002                    IDT   'L6DIAG'
0003                    OPTION X
0004            *
0005            *
0006            *       *******************************
0007            *       ******  LEOPARD SIX  ***********
0008            *       ****  DIAGNOSTIC MODULE  ******
0009            *       *******************************
0010            *
0011            *
0012            *              THIS IS VERSION  8
0013            *
0014            *
0015            *       TMS 7040
0016            *       --------
0017            *       :        :
0018            *       :  P   7 :<------ BUTTONHOLE SWITCH  :LO=CLOSED HI=OPEN
0019            *       :  O   6 :<------ SPARE INPUT
0020            *       :  R   5 :<------ SPARE INPUT
0021            *       :  T   4 :<------ MOTOR SPEED CONTROLLER
0022            *       :      3 : /----
0023            *       :  A   2 : /----  SWITCH MATRIX
0024            *       :      1 :  ----       INPUT
0025            *       :      0 :  ----
0026            *       :        :
0027            *       :  P   3 :------> RIGHT OVERRIDE ACT. LO=ON, HIGH=OFF
0028            *       :  O   2 :------> FEED OVERRIDE ACT.
0029            *       :  R   1 :------> BUTTONHOLE FWD. ADJUST
0030            *       :  T   0 :------> BUTTONHOLE REVERSE ADJUST
0031            *       :        :
0032            *       :  B     :
0033            *       :        :
0035            *       :        :
0036            *       :  P   7 :------> NBR  :LO=CLOSED: HIGH=OPEN
0037            *       :  O   6 :------> FEED CIRCUIT SWITCH :LO=CLOSED: HIGH=OPEN
0038            *       :  R   5 :------> RIGHT CIRCUIT SWITCH :LO=CLOSED: HIGH=OPEN
0039            *       :  T   4 : ----
0040            *       :      3 : ----
0041            *       :  E   2 :------> D/A => R&F DATA
0042            *       :      1 : ----/
0043            *       :      0 : ----/
0044            *       :        :
0045            *       :        :
0046            *       :  P   7 : ---
0047            *       :  O   6 : ----
0048            *       :  R   5 :------>  LED ROW DRIVERS
0049            *       :  T   4 : ----/
0050            *       :      3 : ----/
0051            *       :  F   2 : ----
0052            *       :      1 : ----->  LED COLUMN DRIVERS
0053            *       :      0 : ----/
0054            *       :        :
0055            *       :        :
0056            *       :  P   5 :------> X-Y OVERRIDE SWITCH  :LO=NORMAL
0057            *       :  O   4 :------> BEEPER
0058            *       :  R   3 :------> SPARE
0059            *       :  T   2 : -----
0060            *       :      1 :------> MOTOR SPEED
0061            *       :  G   0 : ----/
0062            *       :        :
0063            *       ----------
0064
0066            *    REPLACEMENT CONSTANTS
0067            *    *********************
0068            *
0069            *
0070   0000  IOCNTL  EQU  P0               I/O CONTROL
0071   0000  PORTG   EQU  >D000            PORT G DATA
0072            *
0073   A000  EXTROM  EQU  >A000            STARTING ADDR OF MODULE
0074   A003  EXTINT  EQU  EXTROM+3         MODULE INIT ROUTINE
0075   A006  EXTSW   EQU  EXTROM+6         MODULE SWITCH DECODE ROUTINE
0076   A009  EXTLED  EQU  EXTROM+9         SET B TO LED # CORRESPONDING TO PATNO
0077   A00C  EXTFFD  EQU  EXTROM+>C        MODULE FEED INTERRUPT ROUTINE
0078   A00F  EXTTIM  EQU  EXTROM+>F        MODULE TIMER INTERRUPT ROUTINE
0079   A012  EXTRIT  EQU  EXTROM+>12       MODULE RIGHT INTERRUPT ROUTINE
0080   A015  EXTSTI  EQU  EXTROM+>15       SET DEFAULT PATTERN #
0081   A019  EXTLEN  EQU  EXTROM+>19       LOAD FROM NEW PATLEN TABLE
0082   A01D  EXTDAT  EQU  EXTROM+>1D       LOAD FROM NEW DATTAB TABLE
0083   A021  EXTPAT  EQU  EXTROM+>21       LOAD FROM NEW PATTAB TABLE
0084   A02C  EXTSPK  EQU  EXTROM+>2C       ENTRY POINT INTO MODULE'S RIGHT
0085                                       ROUTINE WHEN SPARK ADVANCING (CALLED
0086            *                          BY TIMER ROUTINE)
0087   A02F  EXTMTR  EQU  EXTROM+>2F       LOAD FROM NEW MTRTAB TABLE
0088            *
0089            *
0090   003F  HAFSEC  EQU  62               62 * 8 = 496 MILLISEC  (1/2 SEC)
0091            *
0092   0022  REVSW   EQU  34               REVERSE BUTTON
0093   0023  ROVSW   EQU  35               RIGHT OVERRIDE BUTTON
0094   0024  FOVSW   EQU  36               FEED OVERRIDE BUTTON
0095            *
0096   0004  MTR700  EQU  >04              700 RPM (COMMAND TO MOTOR CONTROLLER)
0097            *
0098            *    VARIABLES (REGISTERS)
0099            *    *********************
0100            *
```

```
0105          *
0106    0043  SYNCRF  EQU  R67       MACHINE SYNC REFERENCE  (INDICATES SPEED)
0107          *
0108    004F  CNPAT   EQU  R79       CENTER NEEDLE ONLY PATTERNS
0109          *
0110    0053  INTCNT  EQU  R83       INTERRUPT COUNTER
0111          *
0112    0055  PATNO   EQU  R85       PATTERN NUMBER
0113          *
0114    0060  BPCNT   EQU  R96       BEEPER COUNTER
0115          *
0116    0064  IABUFM  EQU  R100      INDIRECT ADDR BUFFER (MS BYTE)
0117    0065  IABUFL  EQU  R101                           (LS BYTE)
0118          *
0119    0067  PORTG2  EQU  R103      DATA ON PORT G (NEEDED SINCE G CAN'T
0120                                 BE READ)
0121          *
0122    006A  COLCNT  EQU  R106      SWITCH COLUMN COUNTER
0123    006B  ROWNUM  EQU  R107      SWITCH ROW #
0124    006C  BOV     EQU  R108      BIGHT OVERRIDE FLAG
0125    006D  FOV     EQU  R109      FEED OVERRIDE FLAG
0126    006F  TOUCH   EQU  R111      PANEL TOUCH FLAG
0127          *
0128          *
0129    0073  TRMII   EQU  R115      COUNTER WHICH IS DEC EVERY 8 MILLISECONDS
0130          *
0131    0077  SPEED   EQU  R119      MOTOR SPEED (PERIOD)
0132          *
0133          *
0134          *    SUBROUTINE TRAPS
0135          *
0136          *
0137    0017  LEDON   EQU  23        SUBROUTINE TO TURN AN LED ON
0138          *
0139    0016  LEDOFF  EQU  22        SUBROUTINE TO TURN AN LED OFF
0140          *
0141    0015  LEDOUT  EQU  21        SUBROUTINE TO TURN OFF ALL LEDS
0142          *
0143    0014  READ    EQU  20        SUBROUTINE TO READ SWITCHES
0144          *
0145          *
0146    0010  SETLED  EQU  16        SET UP FOR NEW PATTERN
0148          *
0149 A000               AORG  EXTROM
0150          *
0151          *
0152 A000 AA            BYTE  >AA,>55,>03
     A001 55
     A002 03
0153          *
0154          *
0155 A003               AORG  EXTINT
0156 A003 8C            BR    @INIT
     A004 A033
0157          *
0158          *
0159 A006               AORG  EXTSW
0160 A006 0A            RETS
0161          *
0162          *
0163 A009               AORG  EXTLED
0164 A009 0A            RETS
0165          *
0166          *
0167 A00C               AORG  EXTFED
0168 A00C 0A            RETS                      USE STANDARD FEED ROUTINE
0169          *
0170          *
0171 A00F               AORG  EXTTIM
0172 A00F 0A            RETS                      USE STANDARD TIMER ROUTINE
0173          *
0174          *
0175 A012               AORG  EXTBIT
0176 A012 0A            RETS                      USE STANDARD BIGHT ROUTINE
0177          *
0178          *
0179 A015               AORG  EXTSTI
0180 A015 0A            RETS
0181          *
0182          *
0183 A019               AORG  EXTLEN
0184 A019 0A            RETS                      FEED MIRROR CAN'T BE ACTIVE
0185                                              IN THIS MODULE
0186          *
0187 A01D               AORG  EXTDAT
0188 A01D AA            LDA   @PATTAB(B)
     A01E A1A4
0189 A020 0A            RETS
0190          *
0191          *
0192 A021               AORG  EXTPAT
0193 A021 AA            LDA   @PATTAB(B)
     A022 A1AA
0194 A024 D0            MOV   A,IABUFM
     A025 64
0195 A026 AA            LDA   @PATTAB+1(B)
     A027 A1AB
0196 A029 D0            MOV   A,IABUFL
     A02A 65
0197 A02B 0A            RETS
0198          *
0199 A02C               AORG  EXTSPK
0200 A02C 0A            RETS                      USE STANDARD BIGHT ROUTINE
0201          *
0202 A02F               AORG  EXTMTR
0203 A02F AA            LDA   @MTRTAB(B)
     A030 A1C1
0204 A032 0A            RETS
```

```
0206            *   VARIABLES & CONSTANTS USED ONLY BY THIS MODULE
0207            *
0208            *
0209    0015  LEDTST   EQU   R21            LED TEST FLAG
0210    0016  LEDPTR   EQU   R22            POINTER TO LED WHICH IS CURRENTLY
0211            *                           BEING LIT BY LED TEST
0212    0017  SPDLED   EQU   R23            # OF LED LIT BY TACH
0213    0018  MTEST    EQU   R24            MOTOR TEST FLAG: 0=OFF, 1=ACTIVE
0214            *
0215    0004  MTP700   EQU   >04
0216    0006  MTPTST   EQU   >06
0217            *
0218    0012  S700     EQU   18             LED FOR 700 RPM (CRESCENT)
0219    0013  S800     EQU   19             LED FOR 800 RPM (RIBBON)
0220    0014  S900     EQU   20             LED FOR 900 RPM (FLOWER)
0221    0015  S1000    EQU   21             LED FOR 1000 RPM (LEAF)
0222    0016  S1100    EQU   22             LED FOR 1100 RPM (STARBURST)
0223    0017  S1200    EQU   23             LED FOR 1200 RPM (WHALE)
0224            *
0225            *
0226            *   INITIALIZATION ROUTINE
0227            *
0228  A033  E9  INIT    POP   A             GET PID OF THE RETURN ADDRESS.
0229  A034  E9          POP   A
0230            *
0231  A035  74          OR    %MTP700,PORTG2  ALLOW THE DRIVE MOTOR TO RUN
      A036  04
      A037  67
0232  A038  12          MOV   PORTG2,A
      A039  67
0233  A03A  8B          STA   @PORTG
      A03B  D000
0234  A03D  05          EINT
0235            *
0236  A03E  72          MOV   %>FF,SPDLED
      A03F  FF
      A040  17
0237  A041  FA          TRAP  LEDOUT         TURN OFF ALL LEDS
0238  A042  72          MOV   %1,LEDTST      SET LED TEST FLAG
      A043  01
      A044  15
0239  A045  05          CLR   LEDPTR         SET LED POINTER
      A046  16
0240  A047  05          CLR   MTEST          CLEAR MOTOR TEST FLAG
      A048  18
0241  A049  72          MOV   %HAFSEC,TBMTL  SET TIMER
      A04A  3F
      A04B  73
0242            *
0243  A04C  8A          LDA   @LEDS1         TURN ON FIRST LED IN LED TEST
      A04D  A1C7
0244  A04F  C0          MOV   A,B
0245  A050  FB          TRAP  LEDON
0246            *
0247            *
0248            *   THIS IS THE START OF THE PANEL ROUTINE
0249            *
0250            *
0251            *
0252  A051  9F  READ1  CALL  @LEDCK          UPDATE LEDS IF NECESSARY
      A052  A125
0253  A054  77          BTJZ  %>01,MTEST,NOTEST  IS MOTOR TEST #1 ACTIVE ?
      A055  01
      A056  18
      A057  0D
0254  A058  06          DINT
0255  A059  12          MOV   PORTG2,A       MOTOR TEST #1 IS ACTIVE
      A05A  67
0256  A05B  23          AND   %>F8,A         GET PID OF OLD MOTOR SPEED CODE
      A05C  F8
0257  A05D  24          OR    %MTRTST,A
      A05E  06
0258  A05F  D0          MOV   A,PORTG2       SET MOTOR CODE TO TEST MODE #1
      A060  67
0259  A061  8B          STA   @PORTG
      A062  D000
0260  A064  05          EINT
0261  A065  05  NOTEST  CLR   COLCNT         INITIAL COLUMN OUTPUT
      A066  6A
0262            *
0263  A067  FB  READ2   TRAP  READ
0264            *
0265  A068  D0          MOV   A,ROWNUM
      A069  6B
0266  A06A  2D          CMP   %>0F,A
      A06B  0F
0267  A06C  F6          JNE   PMAYBE         A BUTTON MAY BE PRESSED
      A06D  22
0268            *
0269  A06E  D3  NXTLNE  INC   COLCNT         TURN ON NEXT LINE IN MATRIX
      A06F  6A
0270  A070  7D          CMP   %>0A,COLCNT    HAVE ALL LINES BEEN SCANNED ?
      A071  0A
      A072  6A
0271  A073  F6          JNE   READ2
      A074  E2
0272            *
0273            *   IF HERE THEN ALL 10 LINES HAVE BEEN SCANNED AND NO TOUCH DETECTED
0274            *
0275  A075  05          CLR   TOUCH          CLEAR PANEL TOUCH FLAG
      A076  6F
0276  A077  77          BTJZ  %>01,MTEST,READ1  IF TEST #1 NOT ACTIVE GOTO READ1
      A078  01
      A079  18
      A07A  D6
0277  A07B  06          DINT
0278            *
```

```
0279 A07C   32         MOV    PATNO,B
     A07D   55
0280                *
0281                *  MOTOR TEST #1 WAS ACTIVE.  RETURN MOTOR TO NORMAL.
0282                *
0283 A07E   AA         LDA    @MTPTAB(B)        INDEX TO THE MOTOR SPEED CONTROL TABLE
     A07F   A1C1
0284 A081   32         MOV    PORTG2,B
     A082   67
0285 A083   53         AND    %>F8,B            MASK OFF THE OLD SPEED
     A084   F8
0286 A085   64         OR     B,A
0287 A086   D0         MOV    A,PORTG2          UPDATE THE OUTPUT PORT (PORTG).
     A087   67
0288 A088   BB         STA    @PORTG
     A089   D000
0289 A08B   D5         CLR    MTEST             TURN OFF MOTOR TEST FLAG
     A08C   1B
0290 A08D   05         EINT
0291                *
0292 A08E   F0         JMP    READ1
     A08F   C1
0294                *
0295                *  THIS SECTION DEBOUNCES THE PANEL TOUCHES
0296                *
0297                *  THIS IS DONE BY:  AFTER RECEIVING A TOUCH THE MICRO WAITS 20MS
0298                *  AND THEN OUTPUTS THE LAST COLUMN VALUE AND READS THE ROWS AGAIN.
0299                *  IF THE ROW READ AFTER 20 MS IS EQUAL TO THE LAST READING THEN
0300                *  THE TOUCH IS GOOD.
0301                *
0302 A090   12     PMAYBE MOV  INTCNT,A          INTCNT= 1 MS INTERRUPT COUNTER
     A091   53
0303 A092   28         ADD    %20,A             ADD 20 MS TO ORIGINAL VAL OF INTCNT
     A093   14
0304 A094   1D     NTDONE CMP  INTCNT,A          WAIT HERE FOR 20 MS
     A095   53
0305 A096   F6         JNE    NTDONE
     A097   FC
0306                *
0307                *  IF HERE, THEN DONE WAITING
0308                *
0309 A098   FB         TRAP   READ
0310 A099   1D         CMP    ROWNUM,A          COMPARE OLD & NEW READINGS
     A09A   6B
0311 A09B   F6         JNE    NXTLNE            NOT THE SAME, SO NOT GOOD TOUCH,
     A09C   01
0312                *                              SO CHECK NEXT COLUMN
0314                *
0315                *  IF HERE THEN GOOD TOUCH.
0316                *
0317                *  THIS SECTION DETERMINES THE BUTTON #
0318                *  FROM THE SWITCHES.
0319                *  THE RESULTS WILL BE AS FOLLOWS:
0320                *
0321                *  ROW           ROWNUM           COLUMN              BUTTON #
0322                *
0323                *   4             0111             0-9                 30-39
0324                *   3             1011             0-9                 20-29
0325                *   2             1101             0-9                 10-19
0326                *   1             1110             0-9                  0-9
0327                *
0328                *  THIS ROUTINE ROTATES ROWNUM RIGHT AND ADDS 10 TO B EVERY TIME A
0329                *  "1" IS SHIFTED OUT.
0330                *
0331 A09D   76         BTJO   %>01,TOUCH,READ1   IGNORE BUTTON IF TOUCH IS SET
     A09E   01
     A09F   6F
     A0A0   B0
0332                *
0333 A0A1   C5         CLR    B
0334 A0A2   DC     SHIFT RR   ROWNUM
     A0A3   6B
0335 A0A4   F7         JNC    FINISH            IF CARRY IS CLEAR THEN FINISHED
     A0A5   04
0336 A0A6   5B         ADD    %10,B             IF HERE THE CARRY IS SET (NOT DONE)
     A0A7   0A
0337 A0A8   F0         JMP    SHIFT
     A0A9   F8
0338                *
0339 A0AA   D3     FINISH INC TOUCH             SET PANEL TOUCH FLAG
     A0AB   6F
0340 A0AC   3B         ADD    COLCNT,B          B=BUTTON #
     A0AD   6A
0341 A0AE   AA         LDA    @SWTAB(B)         CONVERT THE PHYSICAL SWITCH # INTO
     A0AF   A1FF
0342                *                             A LOGICAL BUTTON #
0343                *
0344 A0B1   D0         MOV    A,ROWNUM          TEMPORARY SAVE LOGICAL BUTTON #
     A0B2   6B
0345                *
0346                *  B NOW CONTAINS THE PHYSICAL SWITCH # AND ROWNUM & A CONTAIN THE
0347                *  LOGICAL SWITCH #.
0349                *
0350                *
0351                *  SWITCH DECODE ROUTINE
0352                *
0353                *
0354                *  IN DIAGNOSTIC MODE THE SWITCHES MAY HAVE DIFFERENT MEANINGS.
0355                *  PERFORM THE FUNCTION REQUESTED BY THE SWITCH. IGNORE INVALID
0356                *  SWITCHES.
0357                *
0358                *
0359                *  LOGICAL SWITCH # 0    STRAIGHT STITCH
0360                *                   1    RIC-RAC   (ZIG-ZAG BUTTON)
0361                *                   2    MOTOR TEST #1 (BLINDSTITCH BUTTON)
0362                *                   5    MOTOR TEST #2 (BASTE/TAILOR TACK BUTTON)
```

```
0363                    *               35   RIGHT OVERRIDE
0364                    *               36   FEED OVERRIDE
0365                    *
0366                    *
0367 A0B3  2D           CMP    %00,A
     A0B4  00
0368 A0B5  F2           JEQ    ISPAT2          BUTTON IS STRAIGHT STITCH.
     A0B6  0B
0369 A0B7  2D           CMP    %1,A
     A0B8  01
0370 A0B9  F2           JEQ    ISPAT2          BUTTON IS ZIG-ZAG
     A0BA  04
0371                    *
0372 A0BB  2D           CMP    %5,A            IF BUTTON PUSHED IS PASTE! PUT
     A0BC  05
0373                    *                      MACHINE IN STRAIGHT STITCH AND
0374                    *                      ACTIVATE MOTOR TEST #2
0375 A0BD  F6           JNE    CHKNXT
     A0BE  07
0376                    *
0377 A0BF  05   ISPAT2  CLR    LEDTST          TURN OFF LED TEST WHEN BUTTON
     A0C0  15
0378                    *                      IS PRESSED.
0379 A0C1  05           CLR    T8MIL
     A0C2  73
0380 A0C3  FF           TRAP   SETLED          SET UP FOR PATTERN
     A0C4  F0
0381 A0C4  F0           JMP    READ1
     A0C5  BB
0382                    *
0383 A0C6  2D   CHKNXT  CMP    %2,A
     A0C7  02
0384 A0C8  F6           JNE    FUNC
     A0C9  15
0385 A0CA  77           BTJ7   %>01,LEDTST,BLDST   IS LED TEST ACTIVE ?
     A0CB  01
     A0CC  15
     A0CD  0B
0386 A0CE  05           CLR    LEDTST          YES, TURN IT OFF
     A0CF  15
0387 A0D0  FA           TRAP   LEDOUT
0388 A0D1  05           CLR    T8MIL
     A0D2  73
0389 A0D3  32           MOV    PATNO,B         TURN PATTERN LED ON
     A0D4  55
0390 A0D5  FB           TRAP   LEDON
0391                    *
0392 A0D6  72   BLDST   MOV    %>01,MTEST      BUTTON PRESSED IS BLINDSTITCH.
     A0D7  01
     A0D8  18
0393                    *                      SET MOTOR TEST FLAG
0394                    *
0395 A0D9  72           MOV    %>8F,BPCNT
     A0DA  8F
     A0DB  60
0396 A0DC  BC   RETLOP  BR     @READ1
     A0DD  A051
0397                    *
0398                    *  DETERMINE IF A FUNCTION  BUTTON WAS PRESSED
0399                    *
0400 A0DF  2D   FUNC    CMP    %35,A
     A0E0  23
0401 A0E1  F2           JEQ    RTOVR           BUTTON PRESSED IS RIGHT OVERRIDE.
     A0E2  06
0402 A0E3  2D           CMP    %36,A
     A0E4  24
0403 A0E5  F2           JEQ    FEDOVR          BUTTON PRESSED IS FEED OVERRIDE.
     A0E6  22
0404                    *
0405                    *  MUST BE SOME OTHER BUTTON, SO IGNORE IT.
0406                    *
0407 A0E7  F0           JMP    RETLOP
     A0E8  F3
0409                    *
0410                    *    RIGHT OVERRIDE ROUTINE
0411                    *    ***********************
0412                    *
0413                    *  THIS ROUTINE WILL TOGGLE THE RIGHT OVERRIDE FLAG AND LED
0414                    *
0415 A0E9  76   RTOVR   BTJO   %>01,CNPAT,RETLOP   IGNORE RIGHT OVERRIDE SWITCH
     A0EA  01
     A0EB  4F
     A0EC  FF
0416                    *                      IF CENTER NEEDLE ONLY PATTERN.
0417 A0ED  77           BTJ7   %>01,LEDTST,RTOVR1  WAS LED TEST ON ?
     A0EE  01
     A0EF  15
     A0F0  0B
0418 A0F1  05           CLR    LEDTST          YES, TURN OFF TEST
     A0F2  15
0419 A0F3  FA           TRAP   LEDOUT
0420 A0F4  05           CLR    T8MIL
     A0F5  73
0421 A0F6  32           MOV    PATNO,B         TURN ON PATTERN LED
     A0F7  55
0422 A0F8  FB           TRAP   LEDON
0423                    *
0424 A0F9  72   RTOVR1  MOV    %>8F,BPCNT      SET BEEP COUNTER
     A0FA  8F
     A0FB  60
0425 A0FC  52           MOV    %ROVSW,B
     A0FD  23
0426 A0FE  75           XOR    %>01,ROV
     A0FF  01
     A100  6C
0427 A101  F2           JZ     OFFROV
     A102  03
```

```
0428                *   FOV WAS OFF, TURN LED ON
0429                *
0430
0431  A103   F8         TRAP    LEDON
0432  A104   F0         JMP     RETLOP
      A105   D6
0433                *
0434                *   FOV WAS ON, TURN LED OFF
0435                *
0436  A106   F9  OFFFOV TRAP    LEDOFF
0437  A107   F0         JMP     RETLOP
      A108   D3
0439                *
0440                *
0441                *   FEED OVERRIDE ROUTINE
0442                *   *************************
0443                *
0444                *   THIS ROUTINE WILL TOGGLE THE FEED OVERRIDE FLAG AND LED
0445                *
0446  A109   77  FEDOVR BTJZ   %>01,LEDTST,FOVR1   CHECK IF LED TEST IS ON.
      A10A   01
      A10B   15
      A10C   08
0447  A10D   05         CLR    LEDTST
      A10E   15
0448  A10F   FA         TRAP   LEDOUT              TURN OFF LEDS
0449  A110   05         CLR    TRMIL               CLEAR THE 1/2 SEC. COUNTER.
      A111   73
0450  A112   32         MOV    PATNO,B             TURN ON PATTERN LED
      A113   55
0451  A114   F8         TRAP   LEDON
0452                *
0453  A115   52  FOVR1  MOV    %FOVSW,B
      A116   24
0454  A117   72         MOV    %>8F,BPCNT          SET BEEP COUNTER
      A118   8F
      A119   60
0455  A11A   75         XOP    %>01,FOV            INVERT FEED OVERRIDE
      A11B   01
      A11C   6D
0456  A11D   F2         J7     OFFFOV
      A11F   03
0457                *
0458                *   FOV WAS OFF, TURN LED ON
0459                *
0460  A11F   F8         TRAP   LEDON
0461  A120   F0         JMP    RETLOP
      A121   BA
0462                *
0463                *   FOV WAS ON, TURN LED OFF.
0464                *
0465  A122   F9  OFFFOV TRAP   LEDOFF
0466  A123   F0         JMP    RETLOP
      A124   B7
0468                *
0469                *   ROUTINE TO UPDATE LEDS
0470                *   *************************
0471                *
0472  A125   77  LEDCK  BTJZ   %>01,LEDTST,NTESTL
      A126   01
      A127   15
      A128   21
0473                *
0474                *   LED TEST IS ACTIVE
0475                *
0476                *
0477  A129   12         MOV    TRMIL,A
      A12A   73
0478  A12B   F6         JNZ    DLEDF
      A12C   1C
0479  A12D   72         MOV    %HAFSEC,TRMIL       RESET 1/2 SEC TIMER
      A12E   3F
      A12F   73
0480  A130   32         MOV    LEDPTR,B
      A131   16
0481  A132   AA         LDA    @LEDS1(B)
      A133   A1C7
0482  A135   C0         MOV    A,B
0483  A136   F9         TRAP   LEDOFF              TURN OFF OLD LED
0484                *
0485  A137   D3         INC    LEDPTR              BUMP POINTER
      A138   16
0486  A139   32         MOV    LEDPTR,B            SET B TO BUTTON # WHICH CORRESPONDS
      A13A   16
0487  A13B   AA         LDA    @LEDS1(B)           TO NEW LED.
      A13C   A1C7
0488  A13E   C0         MOV    A,B
0489  A13F   5D         CMP    %>FF,B              IF = >FF, THEN IT IS THE END OF
      A140   FF
0490                *                              THE LIST (SO FINISHED).
0491  A141   F6         JNE    LEDOK
      A142   05
0492  A143   05         CLR    LEDTST              TURN OFF LED TEST
      A144   15
0493  A145   05         CLR    TRMIL
      A146   73
0494  A147   0A         RETS
0495                *
0496  A148   F8  LEDOK  TRAP   LEDON               TURN ON NEW LED.
0497                *
0498  A149   0A  DLEDF  RETS
0499                *
0500                *   WE ARE NOT IN THE LED TEST. TURN REV ON OR OFF
0501                *   DEPENDING ON LEVEL OF ARMSHAFT SIGNAL.
0502                *
0503  A14A   12  NTESTL MOV    TRMIL,A
      A14B   73
```

```
0504 A14C    F6              JN7    DLEDE           ONLY UPDATE ARMSHFT & SPEED LEDS
     A14D    F8                                     APPROX EVERY 8 MILLISECONDS.
0505                  *
0506 A14F    72              MOV    %1,TBMIL
     A14F    01
     A150    73
0507 A151    52              MOV    %REVSW,B
     A152    22
0508 A153    A6              BTJOP  %>02,IOCNTL,ARMHI  IS IT FEED SYNC? (SIGNAL IS HIGH)
     A154    02
     A155    00
     A156    03
0509 A157    F9              TRAP   LEDOFF          TURN OFF LED
0510 A158    F0              JMP    SPDSET
     A159    01
0511                  *
0512 A15A    F8       ARMHI  TRAP   LEDON
0513
0514                  *
0515                  *  SET SPEED LED TO INDICATE MACHINE'S CURRENT SPEED
0516                  *
0517 A15B    7D       SPDSET CMP    %>FF,SPDLED
     A15C    FF
     A15D    17
0518 A15E    F2              JEQ    NOLED           NO LED WAS ON
     A15F    03
0519                  *
0520 A160    32              MOV    SPDLED,B
     A161    17
0521 A162    F9              TRAP   LEDOFF          TURN OFF OLD SPEED LED
0522                  *
0523 A163    7D       NOLED  CMP    %>F0,SYNCRF
     A164    F0
     A165    43
0524 A166    F3              JC     SPDEN2          IF GE F0 THEN EITHER MACHINE IS
     A167    38                                     STOPPED OR IS MOVING VERY SLOWLY
0525                  *                             (LESS THAN 250 RPM) SO DON'T TURN
0526                  *                             ON ANY LIGHTS
0527                  *
0528 A168    7D              CMP    %93,SPEED
     A169    5D
     A16A    77
0529 A16B    F3              JC     SPDEN2          > 92 COUNTS SO < 650 RPM, SO NO LED ON
     A16C    33
0530 A16D    7D              CMP    %80,SPEED
     A16E    50
     A16F    77
0531 A170    F7              JNC    SP850
     A171    04
0532 A172    52              MOV    %S700,B         SPEED IS > 650 AND < 750 RPM
     A173    12
0533 A174    F0              JMP    SPDFIN
     A175    26
0534                  *
0535 A176    7D       SP850  CMP    %70,SPEED
     A177    46
     A178    77
0536 A179    F7              JNC    SP950
     A17A    04
0537 A17B    52              MOV    %S800,B         SPEED IS > 750 AND < 850 RPM
     A17C    13
0538 A17D    F0              JMP    SPDFIN
     A17E    1D
0539                  *
0540 A17F    7D       SP950  CMP    %63,SPEED
     A180    3F
     A181    77
0541 A182    F7              JNC    SP1050
     A183    04
0542 A184    52              MOV    %S900,B         SPEED IS > 850 AND < 950 RPM
     A185    14
0543 A186    F0              JMP    SPDFIN
     A187    14
0544                  *
0545 A188    7D       SP1050 CMP    %57,SPEED
     A189    39
     A18A    77
0546 A18B    F7              JNC    SP1150
     A18C    04
0547 A18D    52              MOV    %S1000,B        SPEED IS > 950 AND < 1050 RPM
     A18E    15
0548 A18F    F0              JMP    SPDFIN
     A190    0B
0549                  *
0550 A191    7D       SP1150 CMP    %52,SPEED
     A192    34
     A193    77
0551 A194    F7              JNC    SP1250
     A195    04
0552 A196    52              MOV    %S1100,B        SPEED IS > 1050 AND < 1150 RPM
     A197    16
0553 A198    F0              JMP    SPDFIN
     A199    02
0554                  *
0555 A19A    52       SP1250 MOV    %S1200,B        SPEED IS > 1150
     A19B    17
0556 A19C    D1       SPDFIN MOV    B,SPDLED
     A19D    17
0557 A19E    F8              TRAP   LEDON
0558 A19F    0A              RETS
0559                  *
0560 A1A0    72       SPDEN2 MOV    %>FF,SPDLED     SPEED IS < 650 RPM, NO LED ON
     A1A1    FF
     A1A2    17
0561 A1A3    0A              RETS
```

```
0563
0564         *
0565         *    PATTERN DATA TABLE
0566         *
0567         *
0568         *    THIS TABLE CONTAINS ALL THE PATTERN INFORMATION
0569         *
0570         *    IT IS ORGANIZED AS FOLLOWS:
0571         *
0572         *            BIT 7&6---- FORCED FEED CODE
0573         *            BIT 5------ AUTOMATIC SINGLE PATTERN
0574         *            BIT 4------ BALANCABLE PATTERN
0575         *            BIT 3------ CENTER NEEDLE ONLY PATTERN
0576         *            BIT 2------ BUTTONHOLE PATTERNS
0577         *            BIT 1------ MENDING PATTERN
0578         *            BIT 0------ CLAM DIG (NEEDLE FEED) PATTERN
0579         *
0580         *
0581         *
0582 A1A4 48   DATTAB  BYTE  ?01001000    STRAIGHT STITCH              00
0583 A1A5 10           BYTE  ?00010000    RIC RAC                      01
0584 A1A6 00           BYTE  ?00000000    UNUSED  (PLACE HOLDER)       02
0585 A1A7 00           BYTE  ?00000000    UNUSED  (PLACE HOLDER)       03
0586 A1A8 00           BYTE  ?00000000    UNUSED  (PLACE HOLDER)       04
0587 A1A9 48           BYTE  ?01001000    SS (MOTOR TEST #2)           05
0588
0589
0590
0591         *    PATTERN DATA STARTING ADDRESS TABLE
0592         *
0593         *
0594 A1AA A1B6  PATTAB  DATA  SS                                        00
0595 A1AC A1B8          DATA  RICRAC                                    01
0596 A1AE A1B6          DATA  SS          UNUSED  (PLACE HOLDER)        02
0597 A1B0 A1B6          DATA  SS          UNUSED  (PLACE HOLDER)        03
0598 A1B2 A1B6          DATA  SS          UNUSED  (PLACE HOLDER)        04
0599 A1B4 A1B6          DATA  SS          MOTOR TEST #2                 05
0600
0601         *
0602         *
0603         *    PATTERN DATA
0604         *
0605         *
0606 A1B6 4F   SS      BYTE  ?01001111,?00000100    STRAIGHT STITCH 10 SPI
     A1B7 04
0607 A1B8 03   RICRAC  BYTE  ?00000011,?10110100,?11100001  TEST PATTERN (RIC-RAC)
     A1B9 B4
     A1BA E1
0608 A1BB 03           BYTE  ?00000011,?10110100,?01000001
     A1BC B4
     A1BD 41
0609 A1BE 03           BYTE  ?00000011,?10111110,?01000101
     A1BF BE
     A1C0 45
0610
0611         *
0612         *
0613         *    SPEED MOTOR CONTROL TABLE
0614         *
0615         *
0616 A1C1 05   MTRTAB  BYTE  >05               SS    ( 1050 RPM ).
0617 A1C2 04           BYTE  >04               RICRAC ( 700 RPM ).
0618 A1C3 04           BYTE  >04           UNUSED  (PLACE HOLDER)
0619 A1C4 04           BYTE  >04           UNUSED  (PLACE HOLDER)
0620 A1C5 04           BYTE  >04           UNUSED  (PLACE HOLDER)
0621 A1C6 07           BYTE  >07               SS  (MOTOR TEST #2)
0622
0623         *
0624         *   THIS TABLE LISTS THE BUTTON #'S WHOSE LEDS ARE TO BE DISPLAYED
0625         *   DURING THE LED TEST.  THE LEDS ARE DISPLAYED IN THE ORDER
0626         *   LISTED IN THE TABLE.  >FF INDICATES THE END OF THE TABLE.
0627         *
0628 A1C7 22   LEDS1   BYTE  34       REVERSE
0629 A1C8 1B           BYTE  27       LARGE BUTTONHOLE
0630 A1C9 1C           BYTE  28       SMALL BUTTONHOLE
0631 A1CA 1D           BYTE  29       ROUND-END BUTTONHOLE
0632 A1CB 21           BYTE  33       SINGLE PATTERN
0633 A1CC 26           BYTE  38       MIRROR
0634 A1CD 27           BYTE  39       FEED MIRROR
0635 A1CE 25           BYTE  37       2X
0636 A1CF 1F           BYTE  31       ENTER
0637 A1D0 20           BYTE  32       MEMORY RECALL
0638 A1D1 00           BYTE  00       STRAIGHT STITCH
0639 A1D2 01           BYTE  01       ZIG-ZAG
0640 A1D3 02           BYTE  02       ZIG-ZAG BLINDSTITCH
0641 A1D4 03           BYTE  03       MULTISTITCH ZIG-ZAG
0642 A1D5 04           BYTE  04       M STITCH
0643 A1D6 05           BYTE  05       BASTE/TAILOR TACK
0644 A1D7 06           BYTE  06       RIGHT ZIG-ZAG
0645 A1D8 07           BYTE  07       LEFT NEEDLE FEED
0646 A1D9 08           BYTE  08       FORWARD MENDING
0647 A1DA 09           BYTE  09       OVEREDGE
0648 A1DB 0A           BYTE  10       FEATHER/TOPSTITCH
0649 A1DC 0B           BYTE  11       BLANKET
0650 A1DD 0C           BYTE  12       BARTACK
0651 A1DE 0D           BYTE  13       SEAMING HONEYCOMB
0652 A1DF 0E           BYTE  14       ARROWHEAD
0653 A1E0 0F           BYTE  15       VINE
0654 A1E1 10           BYTE  16       REVERSE MENDING
0655 A1E2 11           BYTE  17       RIGHT NEEDLE FEED
0656 A1E3 12           BYTE  18       CRESCENT
0657 A1E4 13           BYTE  19       PIBBON
0658 A1E5 14           BYTE  20       FLOWER
0659 A1E6 15           BYTE  21       LEAF
0660 A1E7 16           BYTE  22       STARBURST
0661 A1E8 17           BYTE  23       WHALE
0662 A1E9 18           BYTE  24       GREEK KEY
0663 A1EA 19           BYTE  25       TRIANGLE
```

```
0664  A1FB  1A         BYTE  26         SURE
0665  A1FC  23         BYTE  35         RIGHT OVERRIDE
0666  A1FD  24         BYTE  36         FEED OVERRIDE
0667  A1FE  FF         BYTE  >FF
0669
0670                * THIS TABLE IS USED TO CONVERT A PHYSICAL SWITCH # INTO A LOGICAL
0671                * BUTTON #.  THIS ALLOWS US TO CHANGE THE MEANING OF THE PHYSICAL
0672                * BUTTONS BY JUST CHANGING ONE TABLE.  THE INDEX INTO THE TABLE IS
0673                * IS THE PHYSICAL #.  THE CORRESPONDING VALUE IS THE LOGICAL #.
0674                *
0675                *
0676  A1FF  25  SWTAB  BYTE  37         TWOX
0677  A1F0  27         BYTE  39         FEED MIRROR
0678  A1F1  26         BYTE  38         MIRROR
0679  A1F2  21         BYTE  33         SINGLE PATTERN
067A  A1F3  1C         BYTE  28         SMALL BUTTONHOLE
0681  A1F4  23         BYTE  35         RIGHT OVERRIDE
0682  A1F5  1D         BYTE  29         ROUND-END BUTTONHOLE
0683  A1F6  1F         BYTE  31         ENTER
0684  A1F7  20         BYTE  32         MEMORY RECALL
0685  A1F8  1E         BYTE  30         CLEAR
0686  A1F9  06         BYTE  6          RIGHT NEEDLE ZIG-ZAG
0687  A1FA  07         BYTE  7          LEFT NEEDLE FEED
0688  A1FB  08         BYTE  8          FORWARD MENDING
0689  A1FC  02         BYTE  2          ZIG-ZAG BLIND
068A  A1FD  22         BYTE  34         REVERSE
0691  A1FE  24         BYTE  36         FEED OVERRIDE
0692  A1FF  1B         BYTE  27         LARGE BUTTONHOLE
0693  A200  05         BYTE  5          BASTE
0694  A201  04         BYTE  4          M STITCH
0695  A202  03         BYTE  3          MULTISTITCH ZIG-ZAG
0696  A203  18         BYTE  24         GREEK KEY
0697  A204  19         BYTE  25         TRIANGLE
0698  A205  1A         BYTE  26         SURE
0699  A206  14         BYTE  20         FLOWER
0700  A207  12         BYTE  18         CRESCENT
0701  A208  13         BYTE  19         RIBBON
0702  A209  09         BYTE  9          OVEREDGE
0703  A20A  17         BYTE  23         WHALE
0704  A20B  16         BYTE  22         STARBURST
0705  A20C  15         BYTE  21         LEAF
0706  A20D  0F         BYTE  15         VINE
0707  A20E  10         BYTE  16         REVERSE MENDING
0708  A20F  11         BYTE  17         RIGHT NEEDLE FEED
0709  A210  0B         BYTE  11         BLANKET
0710  A211  01         BYTE  1          ZIG-ZAG
0711  A212  0A         BYTE  10         FEATHER
0712  A213  00         BYTE  0          STRAIGHT STITCH
0713  A214  0E         BYTE  14         ARROWHEAD
0714  A215  0D         BYTE  13         SEAMING HONEYCOMB
0715  A216  0C         BYTE  12         BARTACK
0716                   END
NO ERRORS, NO WARNINGS
```

We claim:

1. An electronically controlled multiple pattern sewing machine having operator controlled input means for selecting functions to be performed by said sewing machine, indicating means for providing an indication of the function selected by an operator via said input means, diagnostic means for operating said sewing machine in a diagnostic mode, said diagnostic means utilizing said indicating means for providing an indication to said operator of the operation of said sewing machine while in said diagnostic mode, and operator controlled means for selectively causing said diagnostic means to be operative.

2. The sewing machine according to claim 1 wherein said diagnostic means includes means for controlling said indicating means to indicate said sewing machine functions in a predetermined ordered sequence and at a regular rate.

3. The sewing machine according to claim 2 wherein said indicating means includes a plurality of light emitting elements and said controlling means includes means for controlling said indicating means to energize said light emitting elements one at a time each for a predetermined time.

4. The sewing machine according to claim 1 further including motor control means for controlling the speed of operation of said sewing machine and said diagnostic means includes means for monitoring the speed of operation of said sewing machine and means responsive to said monitoring means for utilizing said indicating means to indicate said speed of operation.

5. The sewing machine according to claim 4 further including an operator settable member communicating with said motor control means for operator control of the speed of said sewing machine and said diagnostic means includes means for controlling said motor control means to operate said sewing machine at a predetermined speed independent of said operator settable member.

6. The sewing machine according to claim 1 wherein said diagnostic means includes means for utilizing said indicating means to indicate the relative position of the sewing machine needle.

* * * * *